United States Patent

Manson et al.

[11] 3,935,248
[45] Jan. 27, 1976

[54] ANTHRAQUINONE DYES
[75] Inventors: John Stuart Manson; Denis Robert Annesley Ridyard, both of Manchester, England
[73] Assignee: Imperial Chemical Industries Limited, London, England
[22] Filed: Nov. 19, 1974
[21] Appl. No.: 525,276

Related U.S. Application Data
[63] Continuation of Ser. No. 243,857, April 13, 1972, abandoned.

[52] U.S. Cl. ............... 260/378; 8/34; 8/39; 260/371; 260/380
[51] Int. Cl.[2] ............... C07C 97/24; C09B 1/16
[58] Field of Search ............... 260/378, 371, 380

[56] References Cited
UNITED STATES PATENTS
3,882,150  5/1975  Frey et al. ............... 260/371
3,883,567  5/1975  Harvey ............... 260/380

Primary Examiner—Arthur P. Demers
Attorney, Agent, or Firm—Cushman, Darby & Cushman

[57] ABSTRACT

A water-soluble anthraquinone dye having the general formula:

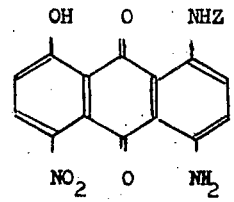

wherein Z represents an optionally substituted hydrocarbon residue carrying at least one half sulphuric acid ester or sulphonic acid group. The dyes are suitable for the coloration of polyamide textile materials.

2 Claims, No Drawings

ANTHRAQUINONE DYES

This is a continuation of application Ser. No. 243,857 filed Apr. 13, 1972, now abandoned.

This invention relates to anthraquinone dyes and more particularly to water-soluble anthraquinone dyes and their application to textile materials.

According to the invention there are provided water-soluble anthraquinone dyes having the general formula:

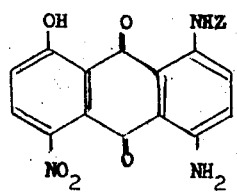

(I)

wherein Z represents an optionally substituted hydrocarbon residue carrying at least one half sulphuric acid ester or sulphonic acid group.

Optionally substituted hydrocarbon residues which may be present in Z include optionally substituted aliphatic, cycloaliphatic and aromatic residues and mixtures thereof. In addition to carrying at least one half sulphuric acid ester or sulphonic acid group the residues may optionally carry other substituents not of a hydrocarbon nature for example halogen, hydroxy, alkoxy and aryloxy and, where appropriate, the half sulphuric acid ester or sulphonic acid group may be present in the substituent.

As examples of substituents which may be represented by Z there may be mentioned the following:

(a) 

wherein R represents hydrogen or alkyl, X represent optionally substituted alkylene and W represents —O— or a direct link, (b) 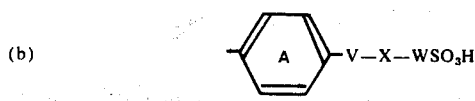

wherein X represents optionally substituted alkylene, especially ethylene, V represents a direct link, —O—, —S— or —NQ— wherein Q is hydrogen or lower alkyl, W represents —O— or a direct link and aromatic ring A may be optionally substituted by alkyl, alkoxy, hydroxy or halogen, (c) 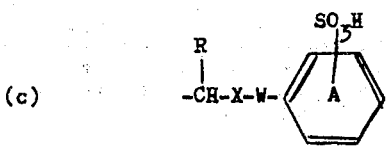

wherein R represents hydrogen or alkyl, X represents a direct link or optionally substituted alkylene, W represents —O— or a direct link and aromatic ring A may optionally be substituted by alkyl, alkoxy, or hydroxy (d) 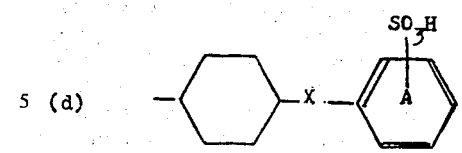

wherein X may be optionally substituted alkylene, aromatic ring A may optionally be substituted by alkyl or alkoxy and the cyclohexyl ring may optionally be subtituted (e) 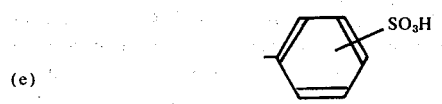

wherein the aromatic ring may optionally be substituted by, for example, alkyl, alkoxy, hydroxy, nitro, acylamino and halogen, for example:

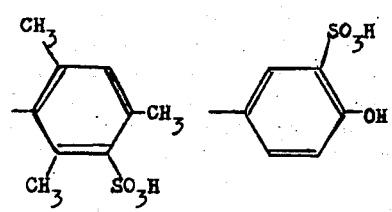

In each of the classes above the free acid form has been shown but it will be understood that the invention covers the water-soluble salts of said acids. In most cases, as with other dyes containing acid groups, it will be found more convenient to use the dyes in the form of their salts particularly, but not exclusively, in the form of their sodium salts.

The dyes of Formula I may be prepared by the sulphation or sulphonation of the corresponding unsulphated or unsulphonated anthraquinone compound. In particular the dyes may be prepared by reacting a sulphating or sulphonating agent with an anthraquinone compound of the formula:

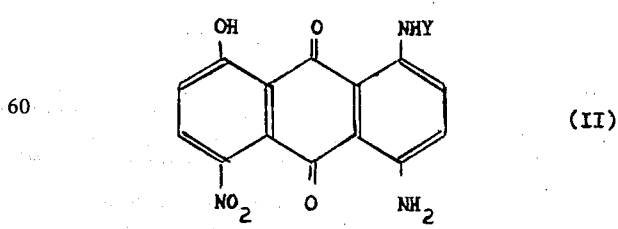

(II)

wherein Y represents a hydrocarbon residue optionally carrying one or more hydroxy and/or other substituents.

Sulphating agents are agents capable of converting a hydroxy group into a half sulphuric acid ester group. Sulphonating agents are agents capable of introducing sulphonic acid groups. Agents for carrying out these reactions, for example concentrated sulphuric acid, oleum and chlorosulphonic acid, and conditions for their use, have been fully described in the prior art.

Dyes in which a sulphonic acid group is directly attached to an alkylene residue may be prepared by reacting the corresponding halogen substituted compound with sodium sulphite.

As has been described in our co-pending United Kingdom Pat. Application No. 30618/69 and published in Netherlands Pat. Application No. 7008813, anthraquinone compounds of Formula II may be prepared by reacting 1,8-dihydroxy-4-amino-5-nitroanthraquinone with a primary amine ($YNH_2$) in the presence of boric acid or its anhydride or a derivative of formula $(MO)_3B$ where M is an alkyl or aryl radical and as specific examples of such compounds there may be mentioned tri-n-propyl borate, tri-n-butyl borate, tri-sec-butyl borate, tri-n-amyl borate, tri-n-hexyl borate, triphenyl borate, tri-p-methyl phenylborate and tri-p-chlorophenyl borate. It is preferred to use between one and three mols of boric acid or a derivative thereof for each mol of the anthraquinone compound. The reaction may optionally be carried out in the presence of an organic solvent preferably a phenolic compound. The 1,8-dihydroxy-4-amino-5-nitroanthraquinone, the primary amine and the boric acid or derivative may conveniently be stirred together, preferably at a temperature between 50°C. and the boiling point of the reaction mixture, for a time which is usually in the region of from 15 minutes to 30 hours.

As specific examples of primary amines of formula $YNH_2$ there may be mentioned β-hydroxyethylamine, β-or γ hydroxy-n-propylamine, benzylamine, β-phenylethylamine, 2-benzylcyclohexylamine, aniline, o-, m- or p-toluidine, o-, m- or p-(chloro or bromo)aniline, o-, m- or p- (hydroxy, amino,methoxy or ethoxy)aniline, 4-(β-hydroxyethyl)aniline, 4-(β-hydroxyethoxy) aniline, 2,4,6-trimethylaniline, 2,6-diethylaniline, p-aminoacetanilide and p-amino-N-methylacetanilide.

The dyes of the present invention are suitable for the coloration of polyamide textile materials, particularly synthetic polyamide textile materials such as polyhexamethyleneadipamide materials. The dyes may be applied by the methods already described for the application of water-soluble acid dyes to polyamide materials.

The dyes of the invention give bright colorations on synthetic polyamide textile materials having high light and wet fastness properties.

The invention is illustrated but not limited by the following Examples in which all parts and percentages are by weight.

EXAMPLE 1

1.5 Parts of 1-(4'-β-hydroxyethoxyphenyl)amino-4-amino-5-nitro-8-hydroxyanthraquinone are added with stirring at 0.5°C to 20 parts of 98 % sulphuric acid over 5 minutes. After stirring for a further 2 minutes at 0°–5°C the reaction mixture is added to 250 parts of ice and water. The precipitated product which has the formula:

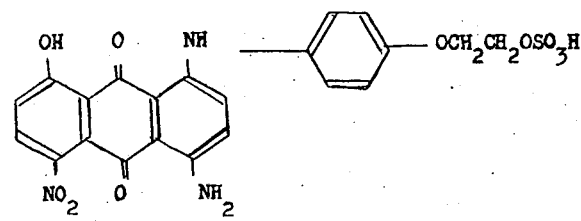

is filtered off, washed with 500 parts of 10 % brine solution and dissolved in 150 parts of water. The pH of the solution is adjusted to 7 and 7.5 parts of sodium chloride are added. The product is filtered off, washed with 5 % brine and dried.

When applied to nylon 66 from a weakly acid bath the dyestuff yields a bright greenish blue shade having excellent fastness to wet treatments and to light.

The 1-(4'-β-hydroxyethoxyphenyl)amino-4-amino-5-nitro-8-hydroxyanthraquinone used in this example is prepared by condensation of 4-β-hydroxyethoxyaniline with the boric acid complex of 1,8-dihydroxy-4-amino-5-nitroanthraquinone in phenol as described in Netherlands Patent Application No. 7008813.

The following Table gives further examples of dyestuffs which are obtained by sulphation, using the process outlined in Example 1 of dyestuffs of formula III.

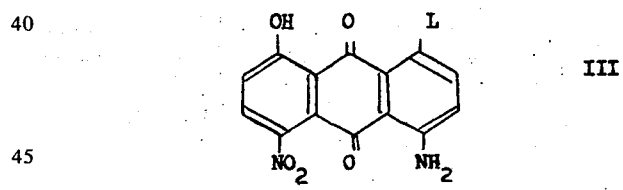

III where L is the substituent specified in the third column. The dyestuffs of formula III are prepared by reacting 1,8-dihydroxy-4-amino-5-nitroanthraquinone with the amines listed in the second column according to the conditions described in Netherlands Patent Application No. 7008813. The fourth column of the Table gives the shades obtained when the dyestuffs are applied to polyamide textile materials.

| Example | Amine | L | Shade |
|---|---|---|---|
| 2 | 1,2-dimethyl-3-hydroxy-propylamine | 1,2-dimethyl-3-hydroxypropylamino | Blue |
| 3 | 4-(β-hydroxyethyl)aniline | 4-(β-hydroxyethyl)phenylamino | Greenish-Blue |
| 4 | 4-(N-ethyl-N-β-hydroxyethylamino)-aniline | 4-(N-ethyl-N-β-hydroxyethylamino)phenylamino | '' |
| 5 | 4-(β-hydroxyethylthio)aniline | 4-(β-hydroxyethylthio)phenylamino) | '' |
| 6 | 2-aminoethanol | 2-hydroxyethylamino | Blue |
| 7 | 2-aminopropanol | 1-methyl-2-hydroxyethylamino | '' |
| 8 | 3-aminopropanol | 3-hydroxypropylamino | '' |

EXAMPLE 9

2.0 Parts of 1-(1'-methyl-3'-phenylpropyl)amino-4-amino-5-nitro-8-hydroxyanthraquinone are added with stirring at 0°–5°C to 21 parts of 95 % sulphuric acid over 30 minutes. The reaction temperature is then allowed to come to 18°–20°C and after stirring for a further 3 hours at 18°–20°C, the reaction mixture is poured into 250 parts of ice and water. The precipitated dyestuff which has the formula:

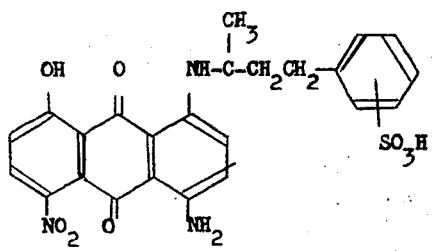

is filtered off, washed with 500 parts of 10 % brine solution and dissolved in 150 parts of water. The pH of the solution is adjusted to 7 and 7.5 parts of sodium chloride are added. The dyestuff is filtered off, washed with 5 % brine solution and dried.

When applied to nylon 66 fibres from a weakly acid bath the dyestuff yields a bright blue shade having excellent fastness to wet treatments and to light.

EXAMPLE 10

If the 2.0 parts of 1-(1'-methyl-3'-phenylpropyl)amino-4-amino-5-nitro-8-hydroxyanthraquinone used in Example 9 are replaced by 2.0 parts of 1-(4'-methoxyphenyl)amino-4-amino-5-nitro-8-hydroxyanthraquinone, a dyestuff having the formula:

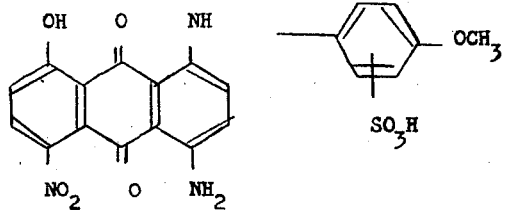

is obtained.

When applied to nylon 66 fibres from a weakly acid bath, a greenish blue shade is obtained, having excellent fastness to washing and to light.

The following Table gives further examples of dyestuffs which are obtained by monosulphonation of the dyestuffs of formula III, where L is the substituent specified in the third column. The dyestuffs of formula III are prepared by reacting 1,8-dihydroxy-4-amino-5-nitroanthraquinone with the amines listed in the second column according to the conditions described in Netherlands Patent Application No. 7008813. The fourth column indicates the shades obtained when the dyestuffs are applied to polyamide textile materials.

| Example | Amine | L | Shade |
| --- | --- | --- | --- |
| 11 | 2,4,6-trimethylaniline | 2,4,6-trimethylphenylamino | Blue |
| 12 | 2-benzylcyclohexylamine | 2-benzylcyclohexylamino | " |
| 13 | 4-hydroxyaniline | 4-hydroxyphenylamino | Greenish-blue |
| 14 | 2-phenoxyethylamine | 2-phenoxyethylamino | Blue |
| 15 | o-toluidine | 2-methylphenylamino | Blue |
| 16 | m-toluidine | 3-methylphenylamino | " |
| 17 | p-toluidine | 4-methylphenylamino | " |
| 18 | 4-ethylaniline | 4-ethylphenylamino | " |
| 19 | 4-isopropylaniline | 4-isopropylphenylamino | " |
| 20 | 4-tert-butylaniline | 4-tertbutylphenylamino | " |
| 21 | benzylamino | benzylamino | " |
| 22 | 4-ethoxyaniline | 4-ethoxyphenylamino | Greenish-blue |
| 23 | 2,4-dimethylaniline | 2,4-dimethylphenylamino | Blue |
| 24 | aniline | phenylamino | " |
| 25 | 4-chloroaniline | 4-chlorophenylamino | " |
| 26 | 2-methyl-4-butylaniline | 2-methyl-4-butylphenylamino | " |

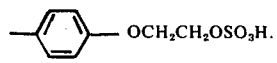

We claim:
1. A water-soluble anthraquinone dye having the formula

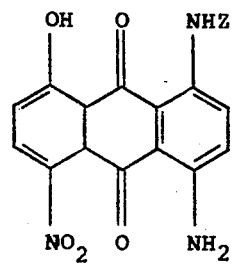

wherein Z represents a member selected from the group consisting of (a) -X-OSO$_3$H wherein X represents alkylene containing 2 to 5 carbon atoms and (b) 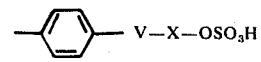

wherein V represents oxygen, sulphur, ethylimino or a direct link and X represents ethylene.

2. The dye of claim 1 wherein Z is